(No Model.) 6 Sheets—Sheet 1.

T. H. BLAIR & F. H. KELLEY.
PHOTOGRAPHIC CAMERA.

No. 491,920. Patented Feb. 14, 1893.

(No Model.) 6 Sheets—Sheet 3.

T. H. BLAIR & F. H. KELLEY.
PHOTOGRAPHIC CAMERA.

No. 491,920. Patented Feb. 14, 1893.

WITNESSES
INVENTORS (No Model.) 6 Sheets—Sheet 4.
T. H. BLAIR & F. H. KELLEY.
PHOTOGRAPHIC CAMERA.
No. 491,920. Patented Feb. 14, 1893.
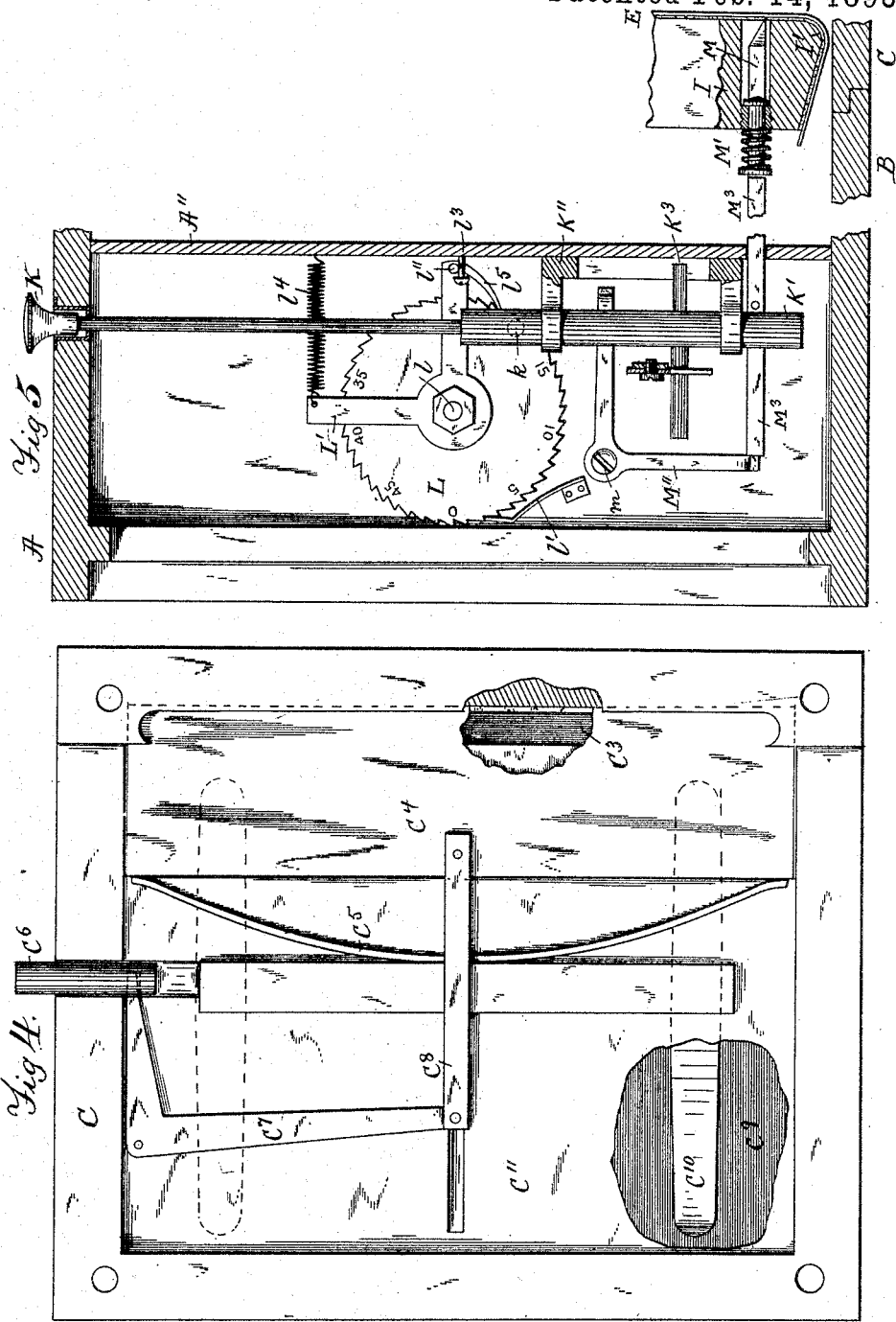
Witnesses
Irving H. Fay
Alice A. Perkins
Inventors
Thomas H. Blair, and
Fred H. Kelley, by
Alban Andrew their Atty.

(No Model.) 6 Sheets—Sheet 5.
T. H. BLAIR & F. H. KELLEY.
PHOTOGRAPHIC CAMERA.
No. 491,920. Patented Feb. 14, 1893.
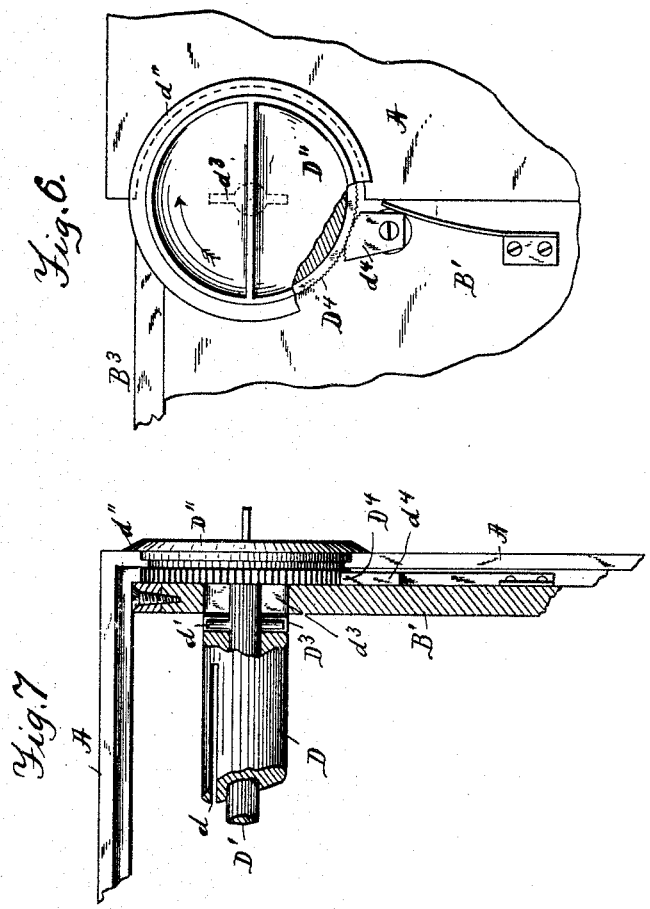

(No Model.) 6 Sheets—Sheet 6.

T. H. BLAIR & F. H. KELLEY.
PHOTOGRAPHIC CAMERA.

No. 491,920. Patented Feb. 14, 1893.

WITNESSES
Irving H. Fay.
Alice A. Perkins.

INVENTORS.
Thomas H. Blair
and Fred H. Kelley
by Alban Andrew their
ATTY.

THE NORRIS PETERS CO., PHOTO-LITHO., WASHINGTON, D. C.

UNITED STATES PATENT OFFICE.

THOMAS H. BLAIR AND FRED H. KELLEY, OF BOSTON, MASSACHUSETTS, ASSIGNORS TO THE BLAIR CAMERA COMPANY, OF SAME PLACE.

PHOTOGRAPHIC CAMERA.

SPECIFICATION forming part of Letters Patent No. 491,920, dated February 14, 1893.

Application filed July 25, 1891. Serial No. 400,734. (No model.)

*To all whom it may concern:*

Be it known that we, THOMAS H. BLAIR and FRED H. KELLEY, citizens of the United States, and residents of Boston, in the county of Suffolk and State of Massachusetts, have jointly invented new and useful Improvements in Cameras, of which the following, taken in connection with the accompanying drawings, is a specification.

Figure 1:
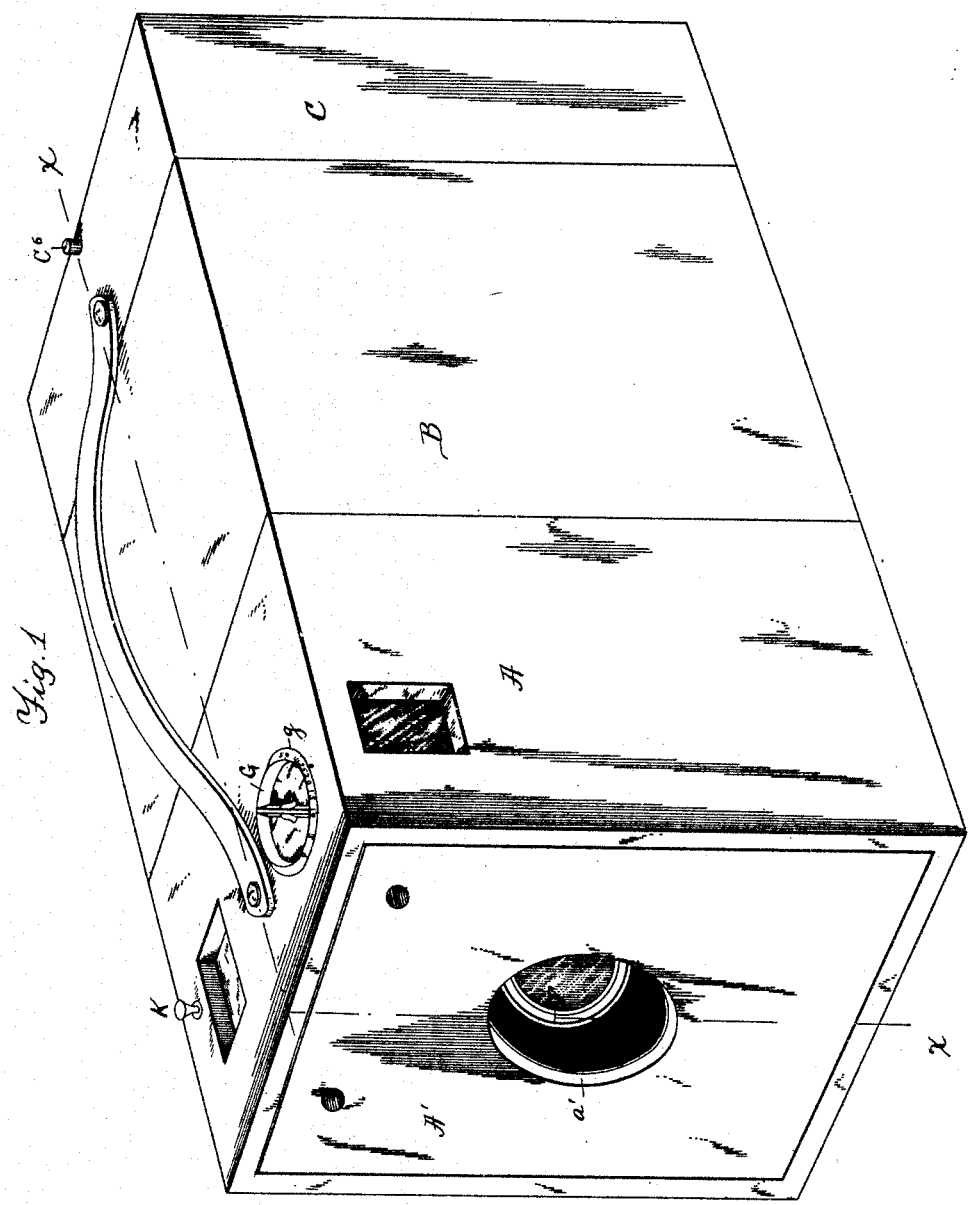
Figure 2:
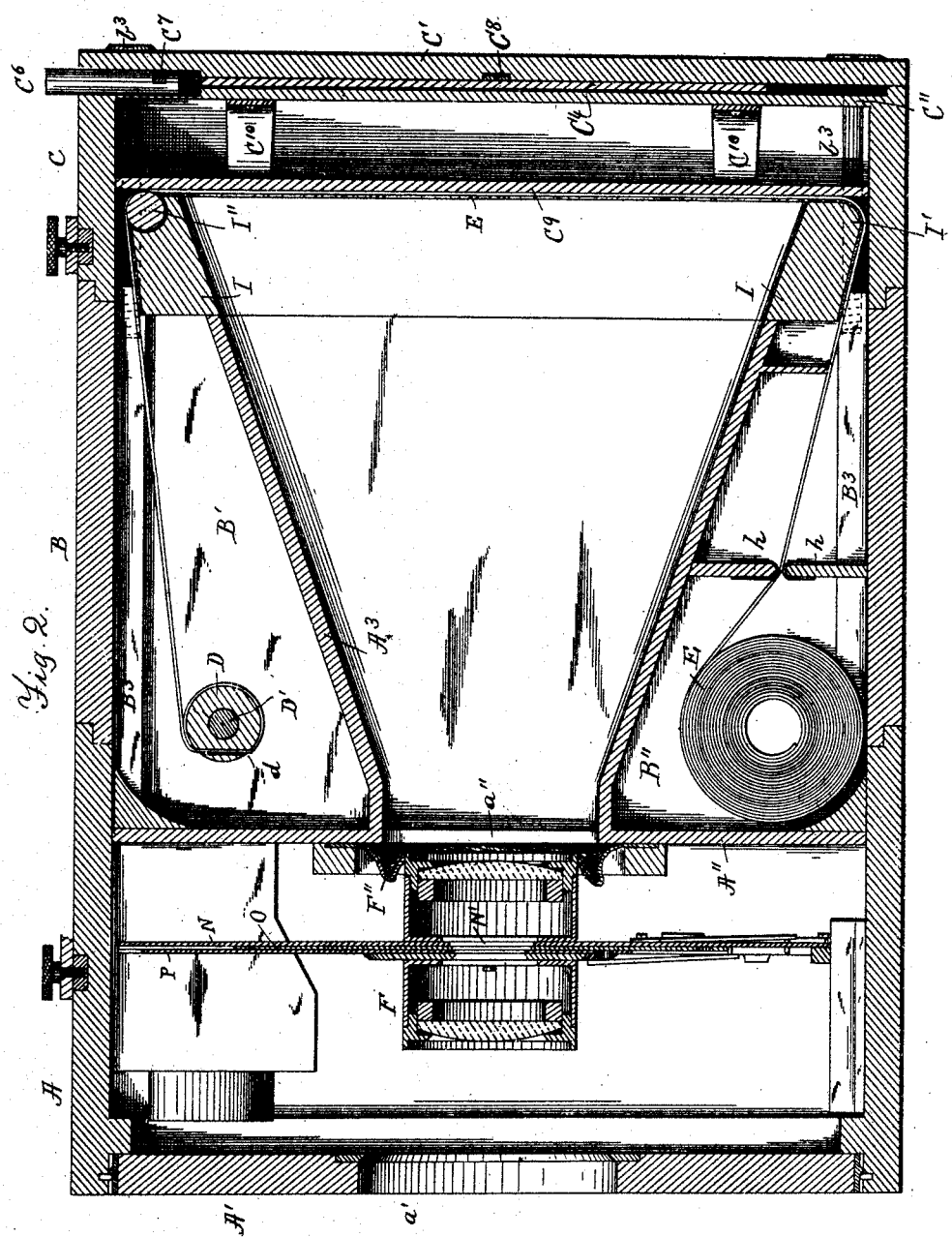
Figure 3:
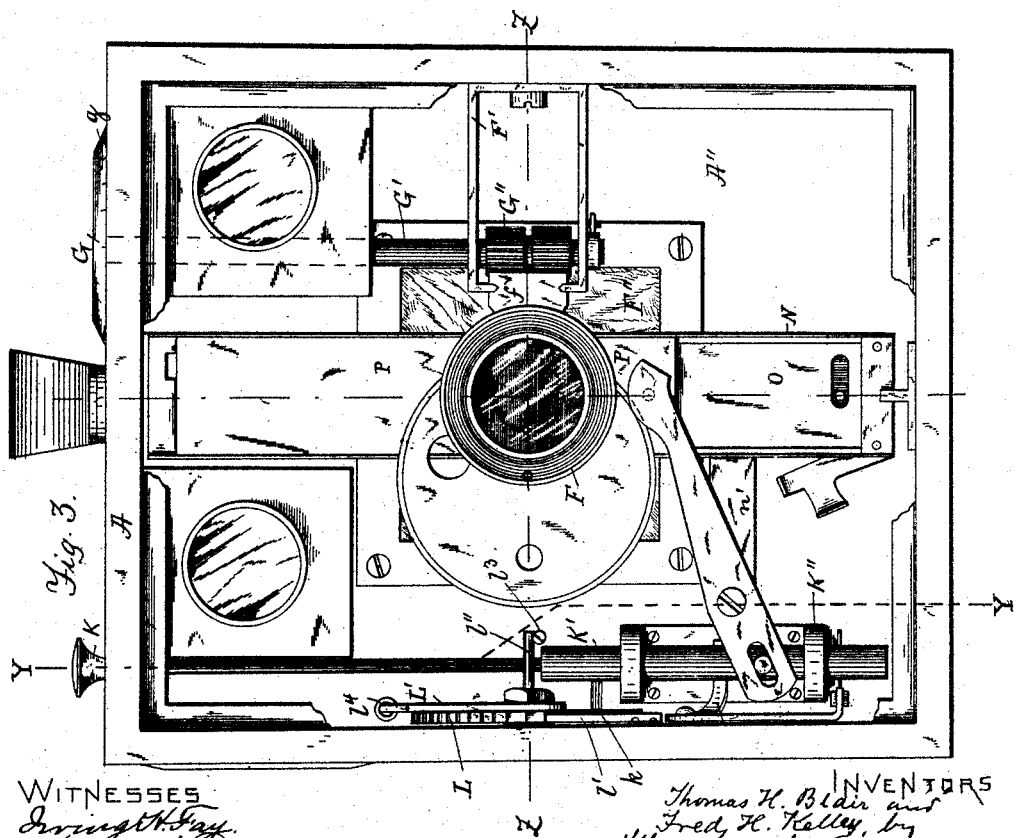

This invention has for its object to provide a new and improved roll holding camera, and it consists in the features of construction and the combination or arrangement of devices hereinafter described and claimed, reference being made to the accompanying drawings, in which Figure 1, is a perspective view of a camera embodying our invention. Fig. 2, is a longitudinal sectional view taken on the line X—X Fig. 1. Fig. 3, is an end view of the camera omitting the cover, the shutters being in their normal position. Fig. 4, is a rear end view of the camera omitting the end cover. Fig. 5, is a cross section taken on the line Y—Y Fig. 3. Fig. 6, is a detail front view of the film winding device. Fig. 7, is a side view of the same; and Fig. 8, is a longitudinal sectional view taken on the line Z—Z Fig. 3.

Similar letters refer to similar parts wherever they occur on the different parts of the drawings.

Figure 8:
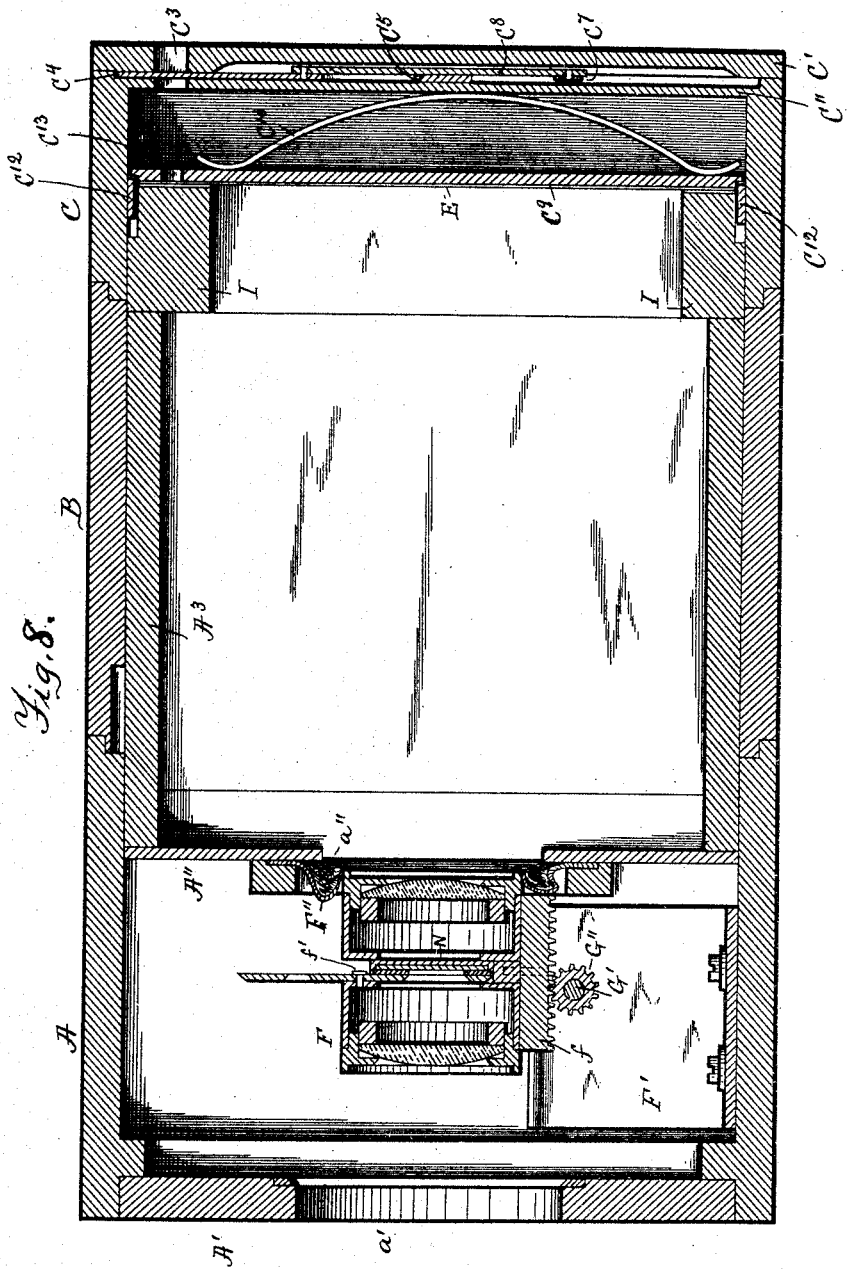

The improved camera is composed of three sections, namely: a lens and shutter containing front section A; a film containing middle section B and a removable rear section C containing the film cushion and spring actuated door to ascertain the position of the film as shown in Figs. 1, 2 and 8.

A' is the detachable front cover having lens perforation $a'$ as shown in Figs. 1, 2 and 8.

A'' is a diaphragm secured within the front section A, said diaphragm having a lens perforation $a''$ leading to the exposing chamber $A^3$, which forms a part of the front section A as shown in Fig. 2; the middle section B incloses the exposing chamber with intervening spaces or chambers B' and B'' between said part as shown, the former containing the take up roller D, and the latter the roll of sensitive film E shown in Fig. 2.

F is the longitudinally adjustable lens having secured to it a rack $f$ which is guided in a bracket F' secured within the section A as shown in Figs. 3 and 8.

F'' is a flexible tube connection between the inner end of the lens and the diaphragm A'' for the purpose of adjusting and focusing the said lens.

The lens is adjusted by means of a handle or disk G arranged on the outside of the section A, said handle being attached to a shaft or spindle G' journaled in the bracket F' and having secured to it a pinion G'' the teeth of which mesh in the teeth of the rack $f$ as shown in Figs. 3 and 8.

For the purpose of strengthening the camera box, metal corner posts $B^3$, $B^3$, are secured to the four corners of the section A, which corner posts are tapped in their rear ends and adapted to receive the fastening screws $b^3$, $b^3$ going through the rear section C, and by such means the middle, rear and front sections are firmly secured together in a detachable manner, so as to enable said rear and middle sections to be removed from the front section when inserting or removing the sensitive film. The roll D upon which the sensitive film is to be wound from time to time, after successive exposures, has a longitudinal slit $d$ (Figs. 2 and 7) through which one end of said film is inserted, and by turning said roll sufficient to cause the end of the film to be overlapped by a continuation of said film, it is readily secured to the roll without any other fastening devices, and it can as readily be removed from the roll whenever so desired. The roll D is detachably mounted upon the roll spindle D' which is journaled in the sides of the roll chamber B' and has attached to one of its ends a circular disk, knob or handle D'', having projecting peripheral lip $d''$ adapted to effectually cover the opening in the box side in which said handle is located as shown in Figs. 6 and 7 so as to prevent the sensitive film from being light struck at this place. A similar lip $g$ (Fig. 3) is made for the same purpose on the knob or disk G by means of which the lens is focused.

The roll D is preferably secured, while in use, to the spindle D' by means of a pin $d'$ on the handle end of the said spindle, adapted to be inserted in a corresponding notch $D^3$ in the end of the roll D as shown in Fig. 7. The perforation in the wall of the roll chamber B' where the handle end of the spindle D' is journaled is made of the slotted form shown by dotted lines at $d^3$, Fig. 6, to enable the pin or roll locking projection $d'$ to be introduced through said wall and removed therefrom.

The handle D'' has a serrated cylindrical surface $D^4$ adapted to engage with a pivoted serrated and spring pressed locking cam $d^4$ (Figs. 6 and 7) so as to permit the roll and its handle to be turned freely in the direction of the arrow shown in Fig. 6, but prevented from being turned in an opposite direction.

For the purpose of properly guiding the sensitive film from the roll E to the film bed, we employ cushioned film gates $h, h$, arranged in the roll chamber B'', between which the said film is guided as shown in Fig. 2, said film gates are preferably made detachable from the case in which they are located and may have their ends fitting in grooves or recesses on the interior of the case or otherwise be made detachable therefrom in any suitable manner.

I is the removable film bed resting against the open rear end of the exposing chamber $A^3$ as shown in Figs. 2, 6 and 8, said film bed having preferably a rounded edge I' over which the film is guided from the reel and a loosely journaled roller I'' from which the film is guided to the take up roller D.

The detachable rear section C is provided with a cover C' and a diaphragm C'' arranged parallel to the cover Fig. 8, in such manner as to provide an intervening space in which are arranged a spring-impelled gate $C^4$ and a gate-moving lever $C^8$ and link $C^7$, hereinafter explained. The cover C' and diaphragm C'' are provided with coincident openings to form a sight-slot $C^3$, Fig. 8, which may be opened and closed by the gate.

In this camera we use a puncturing device actuated by the shutter operating mechanism for the purpose of puncturing or marking the edge of the film previous to making an exposure so as to enable the operator to cut the film on lines between the successive exposures, and it is desirable that the marked edges of the film should be seen while feeding it to enable the operator to feed the film the required distance for the next exposure and for this purpose a slotted perforation $C^3$ is made through the parts C', C'', which is normally closed by means of a gate $C^4$ actuated by a spring $C^5$ (Fig. 5). The mechanism for opening said gate $C^4$ consists of a press button or rod $C^6$ suitably connected to a pivoted bell crank lever $C^7$ the other end of which is connected to the gate $C^4$ by means of a link $C^8$ as fully shown in Fig. 5. To open the gate $C^4$ it is only necessary to press the button $C^6$ when the gate is moved against the influence of its spring sufficiently to expose the perforations $C^3$. The gate is automatically closed by the spring $C^5$ as soon as the operator relieves his pressure on the button $C^6$.

$C^9$ is the yielding spring cushion arranged within the rear section C, which cushion is held by means of springs $C^{10}$, $C^{10}$, against the film and the film bed I as shown in Figs. 2 and 9.

$C^{12}$, and $C^{12}$, are stops on the interior of the section C for preventing the film cushion from being forced out of said section C when the latter is detached from the other sections.

$C^{13}$, is a slotted perforation in the film cushion $C^9$ arranged directly in a line with the perforation $C^3$ through which a narrow strip of the film may be seen when the gate $C^4$ is opened for the purpose above mentioned.

K is the button by means of which the shutter, exposure register and puncturing or marking device is operated, said button projecting through a perforation in the section A, and to it is attached the rod K' that is guided in a bracket K'' secured within the section A as shown in Figs. 3, 4 and 6.

The registering device, operated by the rod K', for the purpose of indicating a successive number of exposures is constructed and actuated as follows: On a stud $l$, secured within the section A is loosely journaled the ratchet dial register wheel L which is ordinarily held in position by means of a spring pawl $l'$, or other suitable holding device; on the stud $l$ is pivoted the bell crank lever L' having in one of its ends a stop pin $l''$ which is normally held in contact with a stationary projection $l^3$ by the influence of a spring $l^4$ attached to the other end of said crank lever as shown in Fig. 6.

$l^5$ is a spring pressed pawl located on the pin $l''$ or other part of the bell crank lever as may be most convenient; $k$ is a pin or projection secured to the rod K'. From the above it will be seen that every time the knob K is pulled out it causes the projection $k$ to come in contact with the bell crank lever L' by which the latter is swung on its pivot causing the pawl $l^5$ to drop into the next notch on the periphery of the serrated disk L and as the knob is pushed inward, the spring $l^4$ causes the bell crank lever L' to assume its normal position and in so doing the pawl $l^5$ turns the wheel L one notch around its axis thus registering the number of film exposures made. The movement of the rod K' also actuates the device for puncturing or marking the edge of the sensitive film, every time the knob K is pulled preparatory to making an exposure. The said puncturing or marking device is constructed as follows: In a perforation in the film bed I is arranged the marker or puncturing rod M (Fig. 6) which is normally held from contact with the film by means of a spring M' as shown. On the rod K' is a projection or pin $K^3$ which as the knob K is pulled outward comes in contact with a bell crank lever M'', (pivoted at $m$ within the section A) the outer end of which depresses a rod $M^3$ the rear end of which rests against the front end of the marker bar M, as fully shown in Fig. 6; it will thus be seen that the end of the marker bar M is caused to indent, puncture or mark the edge of the film every time that the knob K of the rod K' is pulled outward.

The shutter and its connecting mechanism are constructed substantially as described and shown in our application for Letters Patent filed June 18, 1892, Serial No. 437,147, for which reason it is unnecessary to here describe the same in detail.

Having thus fully described the nature, construction and operation of our invention, we wish to secure by Letters Patent and claim:

1. A photographic camera, consisting of a front lens carrying section A having a diaphragm A'' from which extends an exposing chamber $A^3$, the detachable middle section B surrounding the exposing chamber and containing a film chamber B'' and a film winding roll D, a detachable rear section C containing a yielding film section $C^9$ and having a cover C' provided with a sight slot $C^3$, a gate $C^4$ for closing and opening the sight slot, and a removable film bed I interposed between the yielding cushion and the base of the exposing chamber, substantially as described.

2. A photographic camera, consisting of a front lens carrying section A having a diaphragm A'' from which extends an exposing chamber $A^3$, the detachable middle section B surrounding the exposing chamber and containing a film chamber B'' and a film winding roll D, a detachable rear section C containing a yielding film cushion $C^9$ and having a cover C' provided with a sight slot $C^3$, a spring pressed gate $C^4$ for opening and closing the sight slot, a pivoted lever $C^7$ connected with the gate, a push button $C^6$ for actuating the lever to slide the gate, and a removable film bed I interposed between the yielding film cushion and the base of the exposing chamber, substantially as described.

3. The combination with a camera box or case having an exposing chamber $A^3$, and a detachable rear section C having a sight slot $C^3$, a gate $C^4$ and a yielding film cushion $C^9$, of a detachable film bed I interposed between the yielding film cushion and the rear end of the exposing chamber, substantially as described.

4. The combination with a camera box or case having an exposing chamber $A^3$, of a film bed I removably arranged against the rear end of the exposing chamber, and having the rounded edge I' and rotating roller I'', a rear section C detachably fitted to the camera box or case and having a cover C' provided with a sight slot $C^3$, a gate $C^4$ for opening and closing the sight slot, a yielding film cushion $C^9$ located between the gate and the film bed, and springs $C^{10}$ acting to force the film cushion toward the film bed, substantially as described.

5. The combination with a camera box or case having a film chamber B'', a film winding roll D, and a film bed I, of a rear section C containing a spring-pressed film cushion $C^9$, a rear cover C' having a sight slot $C^3$, a gate $C^4$ for opening and closing the sight slot, a spring $C^5$ which holds the gate over the sight slot, a bell crank lever $C^7$ pivoted to the rear cover and having a link connection $C^8$ with the gate, and a push button $C^6$ engaging the lever to move the gate away from the sight slot, substantially as described.

In testimony whereof we have signed our names to this specification, in the presence of two subscribing witnesses, on this 10th day of July, A. D. 1891.

THOMAS H. BLAIR.
FRED H. KELLEY.

Witnesses:
  S. N. TURNER,
  WILLIAM H. BALDWIN.